(12) United States Patent
Neumeyer et al.

(10) Patent No.: US 10,462,582 B2
(45) Date of Patent: *Oct. 29, 2019

(54) HEARING AID AND HEARING AID DUAL USE DONGLE

(71) Applicant: III Holdings 4, LLC, Wilmington, DE (US)

(72) Inventors: Frederick Charles Neumeyer, Austin, TX (US); Russell J. Apfel, Austin, TX (US); John Michael Page Knox, Austin, TX (US)

(73) Assignee: III HOLDINGS 4, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,110

(22) Filed: Oct. 24, 2016

(65) Prior Publication Data

US 2017/0118564 A1 Apr. 27, 2017

Related U.S. Application Data

(60) Continuation of application No. 14/719,544, filed on May 22, 2015, now Pat. No. 9,503,825, which is a
(Continued)

(51) Int. Cl.
*H04R 25/00* (2006.01)
*G06F 3/16* (2006.01)

(52) U.S. Cl.
CPC ............ *H04R 25/43* (2013.01); *G06F 3/165* (2013.01); *H04R 25/30* (2013.01); *H04R 25/55* (2013.01);
(Continued)

(58) Field of Classification Search
CPC ........ H04R 29/00; H04R 25/00; H04R 25/55; H04R 25/558; H04R 25/602; H04R 2225/31
(Continued)

(56) References Cited

U.S. PATENT DOCUMENTS 4,845,755 A 7/1989 Busch et al.
5,107,473 A 4/1992 Fuji et al.
(Continued)

FOREIGN PATENT DOCUMENTS

GB 2473664 B 1/2012
WO 2010073749 A1 7/2010
WO 2011159349 A1 12/2011

OTHER PUBLICATIONS

Berger, Elliott. "Dangerous Decibels: How Loud is Too Loud?" <www.dangerousdecibels.org/education/information-center/decibel-exposure-time-guidelines/>, accessed Dec. 23, 2013, 3 pages.
(Continued)

*Primary Examiner* — Suhan Ni
(74) *Attorney, Agent, or Firm* — Polsinelli PC

(57) ABSTRACT

A power dongle for a hearing aid includes conductive wires, each wire having a computing device end and a hearing aid end. A first connector is connected to the computing device end of each of the plurality of conductive wires to releasably couple to an input/output port of the computing device and a second connector is connected to the hearing aid end of each of the plurality of conductive wires to releasably couple to an interface of the hearing aid, the second connector configured to deliver at least one of a first power supply and an audio signal from the computing device to the interface of the hearing aid.

18 Claims, 11 Drawing Sheets

Related U.S. Application Data division of application No. 13/708,009, filed on Dec. 7, 2012, now Pat. No. 9,071,917, which is a continuation of application No. PCT/US2011/001077, filed on Jun. 14, 2011, which is a continuation of application No. 13/007,568, filed on Jan. 14, 2011, now Pat. No. 8,761,421.

(60) Provisional application No. 61/416,688, filed on Nov. 23, 2010, provisional application No. 61/388,349, filed on Sep. 30, 2010, provisional application No. 61/362,211, filed on Jul. 7, 2010, provisional application No. 61/354,675, filed on Jun. 14, 2010.

(52) U.S. Cl.
CPC ......... *H04R 25/552* (2013.01); *H04R 25/556* (2013.01); *H04R 25/305* (2013.01); *H04R 25/453* (2013.01); *H04R 25/505* (2013.01); *H04R 25/554* (2013.01); *H04R 25/602* (2013.01); *H04R 25/70* (2013.01); *H04R 2225/31* (2013.01); *H04R 2225/33* (2013.01); *H04R 2225/39* (2013.01); *H04R 2225/41* (2013.01); *H04R 2225/55* (2013.01); *H04R 2225/61* (2013.01); *H04R 2420/09* (2013.01); *H04R 2430/01* (2013.01); *H04R 2460/03* (2013.01); *H04R 2460/07* (2013.01)

(58) Field of Classification Search
USPC .................. 381/60, 312, 314–315, 322–323
See application file for complete search history.

(56) References Cited

U.S. PATENT DOCUMENTS

| | | |
|---|---|---|
| 5,303,306 A | 4/1994 | Brillhart et al. |
| 5,524,150 A | 6/1996 | Sauer |
| 5,608,803 A | 3/1997 | Magotra et al. |
| 5,651,073 A | 7/1997 | Isu et al. |
| 5,721,783 A | 2/1998 | Anderson |
| 5,727,070 A | 3/1998 | Coninx |
| 5,734,976 A | 3/1998 | Bartschi et al. |
| 5,873,126 A | 2/1999 | Singh |
| 6,078,675 A | 6/2000 | Bowen-Nielsen et al. |
| 6,151,400 A | 11/2000 | Seligman |
| 6,330,339 B1 | 12/2001 | Ishige et al. |
| 6,532,294 B1 | 3/2003 | Rudell et al. |
| 6,574,340 B1* | 6/2003 | Bindner ............ H04R 25/70 381/312 |
| 6,794,852 B2 | 9/2004 | Tran et al. |
| 6,920,229 B2 | 7/2005 | Boesen et al. |
| 7,010,133 B2 | 3/2006 | Chalupper et al. |
| 7,167,571 B2 | 1/2007 | Bentz et al. |
| 7,301,305 B2 | 11/2007 | Tran et al. |
| 7,324,650 B2 | 1/2008 | Fischer et al. |
| 7,397,217 B2 | 7/2008 | Van Brocklin et al. |
| 7,446,505 B2 | 11/2008 | Paul et al. |
| 7,451,256 B2 | 11/2008 | Hagen et al. |
| 7,499,686 B2 | 3/2009 | Sinclair et al. |
| 7,529,545 B2 | 5/2009 | Rader et al. |
| 7,561,708 B2 | 7/2009 | Röhrlein et al. |
| 7,593,822 B2 | 9/2009 | Stewart |
| 7,610,035 B2 | 10/2009 | Van Bosch et al. |
| 7,676,335 B2 | 3/2010 | Ahmed et al. |
| 7,715,576 B2 | 5/2010 | Ribic et al. |
| 7,778,432 B2 | 8/2010 | Larsen et al. |
| 7,787,647 B2 | 8/2010 | Hagen et al. |
| 7,826,631 B2 | 11/2010 | Fischer et al. |
| 7,853,028 B2 | 12/2010 | Fischer et al. |
| 8,265,315 B2 | 9/2012 | Sørensen et al. |
| 8,280,064 B2* | 10/2012 | Prather ............. H04R 25/554 381/60 |
| 8,363,868 B2* | 1/2013 | Fusakawa ............ H04R 25/558 381/60 |
| 8,515,110 B2 | 8/2013 | Neumeyer et al. |
| 8,761,421 B2 | 6/2014 | Apfel et al. |
| 9,071,917 B2 | 6/2015 | Apfel |
| 9,167,339 B2 | 10/2015 | Knox et al. |
| 9,462,397 B2 | 10/2016 | Neumeyer et al. |
| 9,503,825 B2 | 11/2016 | Neumeyer et al. |
| 2003/0008659 A1 | 1/2003 | Waters et al. |
| 2003/0060704 A1 | 4/2003 | Bean et al. |
| 2004/0199146 A1 | 10/2004 | Rogers et al. |
| 2005/0277994 A1 | 12/2005 | McNamee et al. |
| 2005/0281424 A1 | 12/2005 | Rass et al. |
| 2006/0198530 A1 | 9/2006 | Fischer et al. |
| 2007/0014423 A1 | 1/2007 | Darbut et al. |
| 2007/0214893 A1 | 9/2007 | Killion et al. |
| 2007/0255435 A1 | 11/2007 | Cohen et al. |
| 2007/0274531 A1 | 11/2007 | Camp et al. |
| 2008/0037797 A1 | 2/2008 | Goldstein et al. |
| 2008/0136654 A1 | 6/2008 | Toriello et al. |
| 2008/0137873 A1 | 6/2008 | Goldstein et al. |
| 2008/0167531 A1 | 7/2008 | McDermott et al. |
| 2008/0240477 A1 | 10/2008 | Howard et al. |
| 2009/0074216 A1 | 3/2009 | Bradford et al. |
| 2009/0208024 A1 | 8/2009 | Farver et al. |
| 2009/0262964 A1 | 10/2009 | Havenith et al. |
| 2009/0290721 A1 | 11/2009 | Goldstein et al. |
| 2010/0054511 A1 | 3/2010 | Wu et al. |
| 2010/0202637 A1 | 8/2010 | Cornelisse et al. |
| 2010/0296668 A1 | 11/2010 | Lee et al. |
| 2011/0176697 A1 | 7/2011 | Apfel et al. |
| 2011/0200215 A1 | 8/2011 | Apfel et al. |
| 2011/0243345 A1 | 10/2011 | Carreras et al. |
| 2011/0249836 A1 | 10/2011 | Solum et al. |
| 2012/0082329 A1 | 4/2012 | Neumeyer et al. |
| 2012/0130660 A1 | 5/2012 | Neumeyer et al. |
| 2013/0301860 A1 | 11/2013 | Neumeyer et al. |
| 2014/0003641 A1 | 1/2014 | Neumeyer et al. |
| 2015/0256946 A1 | 9/2015 | Neumeyer et al. |
| 2016/0007109 A1 | 1/2016 | Neumeyer et al. |

OTHER PUBLICATIONS

Final Office Action, U.S. Appl. No. 13/007,568, dated May 30, 2013, 19 pages.
Final Office Action, U.S. Appl. No. 13/176,738, dated May 22, 2014, 11 pages.
Final Office Action, U.S. Appl. No. 13/290,269, dated May 1, 2015, 23 pages.
Final Office Action, U.S. Appl. No. 13/708,009, dated Jul. 30, 2014, 9 pages.
Final Office Action, U.S. Appl. No. 13/935,744, dated Jun. 10, 2015, 9 pages.
International Searching Authority, International Search Report and Written Opinion, PCT Patent Application PCT/US2011/001077, dated Nov. 15, 2011, 9 pages.
Non-Final Office Action, U.S. Appl. No. 13/007,568, dated Dec. 12, 2012, 19 pages.
Non-Final Office Action, U.S. Appl. No. 13/176738, dated Feb. 18, 2015, 5 pages.
Non-Final Office Action, U.S. Appl. No. 13/176,738, dated Jan. 16, 2014, 13 pages.
Non-Final Office Action, U.S. Appl. No. 13/176,738, dated Jul. 18, 2013, 16 pages.
Non-Final Office Action, U.S. Appl. No. 13/290,269, dated Feb. 1, 2016, 28 pages.
Non Final Office Action, U.S. Appl. No. 13/290,269, dated Nov. 18, 2014, 20 pages.
Non-Final Office Action, U.S. Appl. No. 13/708,009, dated Jan 21, 2014, 7 pages.
Non-Final Office Action, U.S. Appl. No. 13/935,744, dated Aug. 7, 2015, 10 pages.
Non-Final Office Action, U.S. Appl. No. 13/935,744 dated Dec, 26, 2014, 6 pages.

(56) References Cited

OTHER PUBLICATIONS

Non-Final Office Action, U.S. Appl. No. 13/935,744, dated Feb, 20, 2015, 10 pages.
Notice of Allowance, U.S. Appl. No. 13/007,568, dated Feb. 14, 2014, 5 pages
Notice of Allowance, U.S. Appl. No. 13/176,738, dated Jun. 17, 2015, 9 pages.
Notice of Allowance, U.S. Appl. No. 13/244,260, dated May 1, 2013, 12 pages.
Notice of Allowance, U.S. Appl. No. 13/708,009, dated Feb. 27, 2015, 5 pages.
Resound Alera: End User Brochure, instructional brochure, 2010, M101100-GB-10.02 Rev.A, GN ReSound Group, USA 7 pages.
Restriction Requirement, U.S. Appl. No. 13/708,009, dated Nov. 28, 2014, 5 pages.
Restriction Requirement, U.S. Appl. No. 13/935.744, dated Oct. 10, 2014, 6 pages.
Restriction Requirernent, U.S. Appl. No. 14/719,544, dated Aug. 27, 2015, 5 pages.
United States Patent and Trademark Office, Final Office Action, U.S. Appl. No. 13/290,269, dated Sep. 19, 2016, 35 pages.
United States Patent and Trademark Office, Non-Final Office Action, U.S. Appl. No. 14/719,644, dated Mar. 28, 2016, 5 pages.
United States Patent and Trademark Office, Non-Final Office Action, U.S. Appl. No. 14/853,904, dated Oct. 26, 2016, 16 pages.
United States Patent and Trademark Office, Notice of Allowance, U.S. Appl. No. 13/935,744, dated Jun. 2, 2016, 9 pages.
United States Patent and Trademark Office, Notice of Allowance, U.S. Appl. No. 14/719,544, dated Jul. 13, 2016, 6 pages.

* cited by examiner

HEARING AID AND HEARING AID DUAL USE DONGLE

CROSS-REFERENCE TO RELATED APPLICATION(S)

This application is a continuation of U.S. application Ser. No. 14/719,544, filed May 22, 2015 (now issued as U.S. Pat. No. 9,503,825), which is a divisional of U.S. application Ser. No. 13/708,009, filed on Dec. 7, 2012 (now issued as U.S. Pat. No. 9,071,917) and entitled "LISTENING DEVICE AND LISTENING DEVICE DUAL USE DONGLE," which is a continuation of International Application No. PCT/US2011/001077, filed on Jun. 14, 2011 and entitled "LISTENING DEVICE SYSTEM," which is a continuation of U.S. application Ser. No. 13/007,568, filed Jan. 14, 2011 (now issued as U.S. Pat. No. 8,761,421 on Jun. 24, 2014), and claims priority to U.S. Provisional Application No. 61/416,688, filed on Nov. 23, 2010, and to U.S. Provisional Application No. 61/388,349, filed on Sep. 30, 2010, and to U.S. Provisional Application No. 61/362,211, filed on Jul. 7, 2010, and to U.S. Provisional Application No. 61/354,675 filed on Jun. 14, 2010. The foregoing patents and applications are incorporated herein by reference in their entireties.

FIELD

This disclosure relates generally to an auxiliary power source for a hearing aid, and more particularly, to a power dongle configured to releasably couple to a hearing aid.

BACKGROUND

One of the leading challenges facing designers of hearing aids involves achieving acceptable battery life without impacting the weight, size, and form factor of the hearing aid. Rechargeable batteries with acceptable size and weight for use in a hearing aid can supply adequate power for approximately one day, thus requiring daily recharge. However, daily recharging is not always available, such as when the user is on a camping trip or vacationing. Thus, there is often a tradeoff between a large heavy rechargeable battery or a smaller lighter non-rechargeable battery that has to be replaced frequently.

Most hearing aids today, use inexpensive disposable batteries, such as the common zinc-air batteries. These batteries have a smaller weight and form factor than rechargeable batteries with acceptable battery life, allowing the hearing aid size and weight to be reduced and increasing desirability for potential customers. However, disposable non-rechargeable batteries require regular replacement, increasing the operating cost of the hearing aid in terms of the cost of replacement batteries, which can be significant over the useful life of the hearing aid. Further, such disposable batteries contribute to landfills and may include corrosive and poisonous chemicals that can leak into the environment.

BRIEF DESCRIPTION OF THE DRAWINGS

In the following description, the use of the same reference numerals in different drawings indicates similar or identical items.

DETAILED DESCRIPTION

Conventionally, hearing aids range from ear pieces configured to amplify sounds to more sophisticated hearing aid devices that are configurable by a hearing specialist. In an example, a hearing health professional takes measurements using calibrated and specialized equipment to assess an individual's hearing capabilities in a variety of sound environments, and then programs the hearing aid profiles based on the calibrated measurements to enhance the performance of the hearing aid in a specific acoustic environment, such as in a crowd, outdoors, or in a quiet room. High-end hearing aids may include between two and six different hearing aid profiles, often including a normal profile and a phone profile as two of the hearing aid profiles. A dongle may be coupled to a hearing aid to supply auxiliary power to the hearing aid circuitry, to recharge the hearing aid battery, or both, extending the operational time of the hearing aid before the batteries need to be replaced or recharged. Additionally, the dongle may be further coupled to a media source and provide an audio signal from a media source to the hearing aid in addition to providing power. In some instances, the dongle may be worn, allowing the user to extend the usable battery life of the hearing aid by supplementing the hearing aid's internal power supply.

Figure 1:
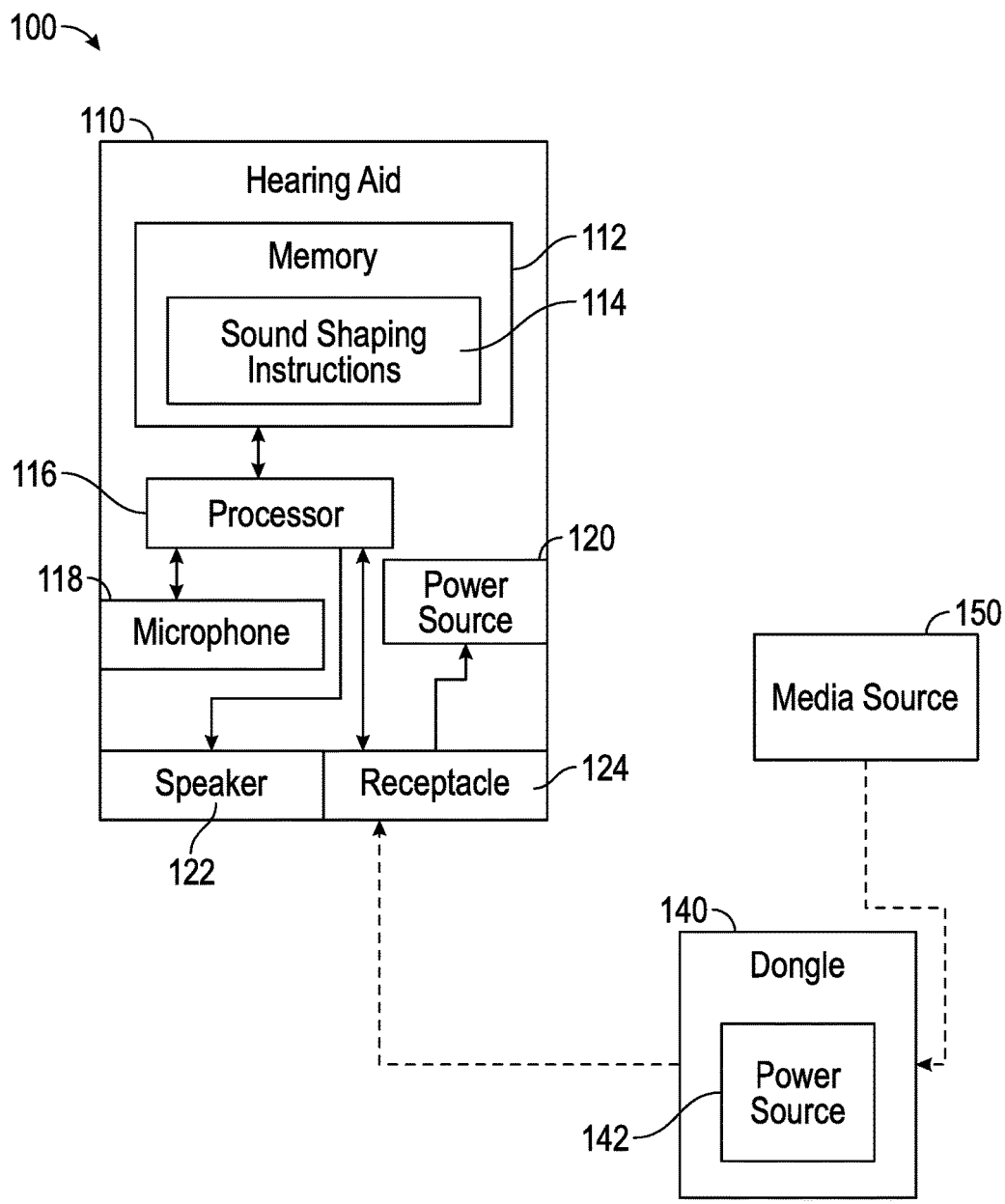
FIG. 1 is a block diagram view of an embodiment of a system including a hearing aid, a dongle, and a media source

FIG. 1 is a block diagram view of an embodiment of a system 100 including a hearing aid 110, a dongle 140, and a media source 150. Media source 150 may be a phone (such as a mobile phone or smart phone), portable music player (such as an MP3, iPod®, or cassette player), computer, stereo or other media-playing device configured to reproduce media content in an audible form.

Dongle 140 is configured to releasably couple to a media source 150 and hearing aid 110 for providing an audio signal and/or a power signal from media source 150 to hearing aid 110. Dongle 140 optionally includes a power source 142 which is configured to provide a second power signal to hearing aid 110 to either provide an auxiliary power source and/or a recharge function, regardless of whether or not dongle 140 is coupled to media source 150.

Hearing aid 110 has a receptacle 124 sized to receive (to electrically couple to) dongle 140. Receptacle 110 is coupled to a power source 120 and a processor 116. Hearing aid 110 further includes microphone 118 connected to processor 116, and includes a speaker 122 coupled to processor 116 and configured to communicate audio data to an ear piece, which may be positioned within the ear canal of a user. Hearing aid 110 also includes a memory 112 which stores sound shaping instructions 114. Memory 112 is coupled to and accessible by processor 116, such that processor 116 is able to execute and shape audio signals according to the sound shaping instructions 114 stored in memory 112. In an alternative embodiment, speaker 122 may be replaced with a driver circuit that is connected by a wire to a speaker within an ear bud (not shown) that is positioned within the ear canal of the user.

In one example when dongle 140 uncoupled from hearing aid 110, microphone 116 converts sounds into a first audio signal and provides the first audio signal to processor 116, which processes the first audio signal according to sound shaping instructions 114 to generate a modulated audio signal configured to compensate for the user's hearing loss. The modified output signal is provided to speaker 122, which reproduces the modulated output signal as an sound. Power source 120 provides power to the circuitry of hearing aid 110, while it modulates audio signals for the user.

In a second example when dongle 140 is coupled to hearing aid 110, hearing aid 110 receives a power signal and/or a second audio signal from dongle 140 at receptacle 124. The power signal may include power from power source 142 and/or media source 150. The second audio signal is the audio signal produced by media source 150.

Processor 116 receives the first audio signal from microphone 116 and the second audio signal from media source 150. Processor 116 combines and shapes both signals according to sound shaping instructions 114 to generate the modulated audio signal. Processor 116 may combine the first and second audio signals into a combined audio signal then shape the combined signal to produce the modulate audio signal or shape each of the first and second audio signals independently to produce a first modulated audio signal and a second modulated audio signal then combine the first and second modulated audio signals into the modulated audio signal. In one example, processor 116 may completely block out the first audio signal while processor 116 receives the second audio signal, such that the modulated audio signal only includes sounds represented in the second audio signal (such as when the user is listening to music).

Hearing aid 110 also receives a power source 120 from dongle 140. When hearing aid 110 receives a power source from dongle 140, power source 120 may be disconnected from the rest of the circuitry of hearing aid 110 to conserve battery life, while hearing aid 110 receives power from dongle 140. In an alternative embodiment, power source 120 may remain connected to the circuitry, and the power signal provides a power assist to power source 120, reducing the power demands on power source 120 and extending the life of power source 120. In another alternative embodiment, the power signal may provide power to recharge power source 120 in lieu of or in addition to providing power directly to the circuitry, thereby recharging and prolonging the life of the power source 120.

While FIG. 1 depicts a system over providing the large picture of the components of system 100 including three devices: hearing aid 110, media source 150, and dongle 140, FIG. 25 depict several possible embodiments of dongle 140.

Figure 2:
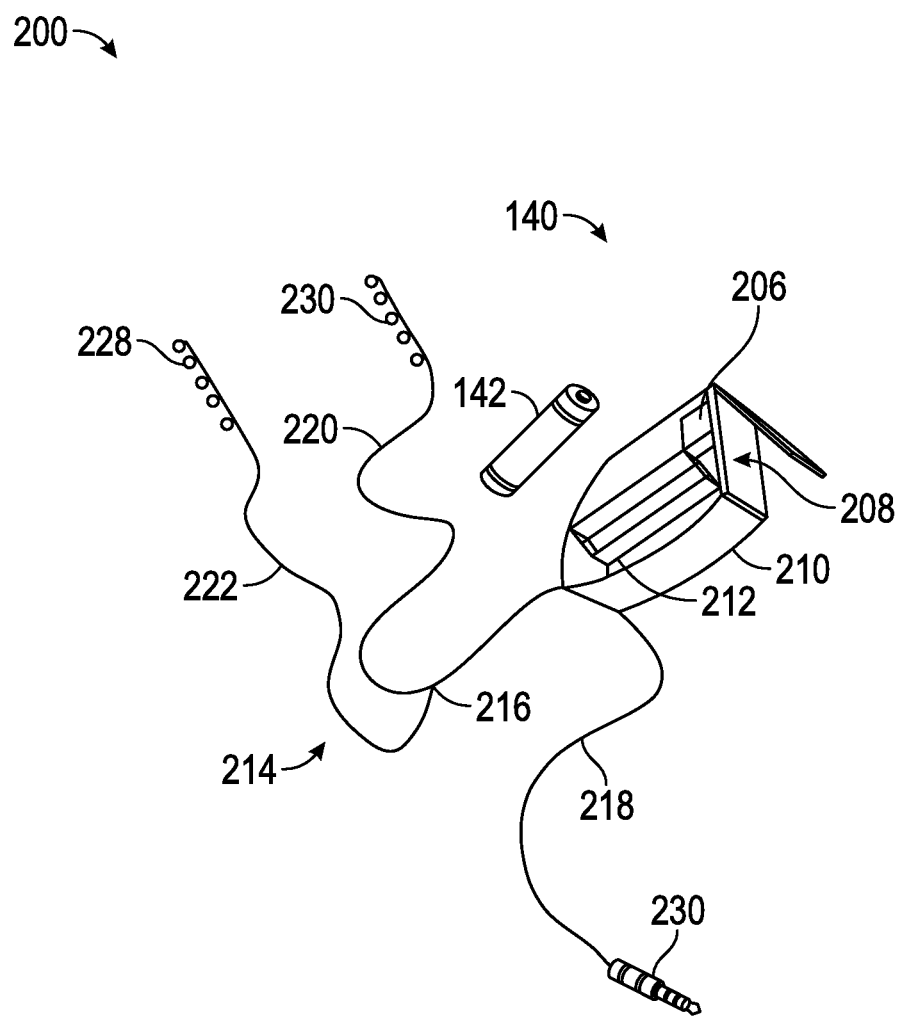
FIG. 2 is a perspective view of an embodiment of the dongle of FIG. 1.

FIG. 2 is a perspective view of an embodiment 200 of dongle 140 of FIG. 1. Dongle 140 which includes power source 142 (shown here as a AAA battery) and a casing 210 that defines a cavity sized to contain a battery receptacle 212 for securing power source 142. In this embodiment, casing 210 is depicted in an exploded view, with power source 142 removed from battery receptacle 212 to demonstrate that power source 142 may be replaceable and that casing 210 may contain an opening for allowing the user to access and replace power source 142. Dongle 140 may also include a removable cover (not shown) to secure power source 142 within battery receptacle 212. In an alternative embodiment, casing 210 may be sealed, and power source 120 may be rechargeable. Additionally, while only one battery is shown, it is possible to include multiple batteries in parallel or series to provide recharge and/or operating power to hearing aid 110.

Power source 142 is optionally coupled to a power regulator 206, which can be configured to regulate the voltage and/or current provided by power source 142 to provide a regulated power supply that can be used within the hearing aid. In some cases, when the power supplied by power source 142 matches that used within hearing aid 110, power regulator 206 may be omitted, switched off, or bypassed.

Dongle 140 may also include a securing mechanism, generally indicated at 208, connected to the outside of casing 210 for securing dongle 140 to a user's clothing. Securing mechanism 208 may be, for example, a clip, clasp, hook, or other known securing device. In the illustrated example, the securing mechanism 208 is a clip configurable to clip onto an object (such as a piece of clothing). For example, securing mechanism 208 allows the user to attach dongle 140 to an article of clothing transferring the weight of dongle 140 from the user to the user's clothing, increasing the comfort, security, and adaptability of using dongle 140.

Power regulator 206 and power source 142 are coupled to a cable, generally indicated by 214, which is designed to releasable couple to receptacle 124 of hearing aid 110 to establish an electrical contact between the devices, for example, to provide the power signal to hearing aid 110. Cable 214 divides into two branches 220 and 222 at branch point 216 for delivering the power signal and/or the second audio signal to two hearing aids. The two branches 220 and 222 include connection interfaces 228 and 230 at the ends opposing the branch point 216. Connection interfaces 228 and 230 are designed to releasably couple to receptacles (such as receptacle 124 of FIG. 1) on a right and a left hearing aid (each represented by hearing aid 110) to provide a power signal and/or an audio signal to both the right and left hearing aids. Cable 214 and branches 220 and 222 allow the user to locate dongle 140 away from the hearing aids and to supply the power signal and audio signal to both a right and left hearing aid at the same time.

Dongle 140 also includes a second cable 218 connected to power regulator 206 and/or cable 214 at one end and a media connector 230 at the other. Media connector 230 is shown as a tip ring sleeve (TRS) connector; however, many other types of connectors are possible including a universal serial bus (USB) connector, modified TRS connector, mini USB connector, or other known media connectors at least capable of providing an audio signal. Media connector 230 is configured to releasably couple to a media source (such as media source 150 of FIG. 1) to receive a power signal and/or an audio signal from media source 150. Cable 218 is configured to provide the power signal to power regulator 206, which regulates the voltage and/or current provided by media source 150 to provide a regulated power supply that may be used to recharge power source 120 or provided directly to hearing aid 110 as the power signal.

In one embodiment, a user couples dongle 140 to at least one hearing aid via connection interfaces 228 and/or 230, which are configured to fit receptacles (such as receptacle 124) on the hearing aids. Connection interfaces 228 and 230 may snap, lock, magnetically mate, hook or otherwise physically, releasably connect to the receptacles. In one example, connection interfaces 228 and 230 may be a mini plug and/or may use a spring locking mechanism to couple to the receptacle. In a second example, connection interfaces 228 and 230 may include a magnetic element that magnetically couples to an element associated with the receptacle of the hearing aid, securing the connection interfaces 228 and 230 to the receptacles using magnetic forces. Once a connection is made, power source 142 provides a power signal to the hearing aids through connection interfaces 228 and 230. Power regulator 206 may receive the power signal from power source 124 and regulate the power signal to produce a regulated power signal suitable for the hearing aids to perform battery management operations (such as normal operation, recharge, etc.).

In another embodiment, a user couples dongle 140 to one or more hearing aids via connection interfaces 228 and/or 230 and a media source 150 via media connector 230. An audio signal is provided to the hearing aids from media source 150 via dongle 140 such that the hearing aids may modulate the audio signal and reproduce the audio signal as a modulated output signal for the hearing aid user. A power signal may also be provided to the hearing aids from dongle 140 such that the hearing aids may perform battery management operations. The power signal may include a power supply from media source 150 and/or a power supply from power source 142. For example, dongle 140 may disconnect power source 142 from cable 214 when receiving a power signal from media source 150 preserving the stored charge of power source 142 until media source 150 is disconnected. In another example, dongle 140 may supplement the power signal form media source 150 with a power supply from power source 142 to increase the power signal provided to the hearing aids. Thus dongle 140 is able to be used to recharge and/or power the hearing aids while the user is listing to an audio signal from a media device, such as when the user is listening music.

In yet another embodiment, a user couples dongle 140 to one or more hearing aids via connection interfaces 228 and/or 230 and a media source via media connector 230. Once a connection is made, an audio signal is provided to the hearing aids from media source 150 via dongle 140 such that the hearing aids may modulate the audio signal and reproduce the audio signal as a modulated output signal for the hearing aid user. Power source 142 also provides a power signal to the hearing aids through connection interfaces 228 and 230, such that the hearing aids are able to perform battery management operations in response to receiving the power signal. Dongle 140 also receives a second power signal from media source 150, which dongle 140 uses to recharge power source 142. In this manner, power source 142 is losing charge as it provides power to the hearing aids and power source 142 gaining charge as it receives power from media source 150.

In an example, the power signal received from dongle 140 may be used in the hearing aid to provide battery management operations such as a recharge to an internal power source of the hearing aid (such as power source 120), providing power to the circuitry within the hearing aid to perform normal hearing aid operations, or both. In a particular example, the hearing aid may include a switch or controllable element accessible via a control device, such as a cell phone or portable computer, to allow the user to select an operating mode (such as recharge).

In the illustrated embodiment, cable 214 is shown with two branches 220 and 222. In an alternative embodiment cable 214 may contain one branch 220 for providing a power signal and/or an audio signal to a single hearing aid 110. For example, in about a third of the cases a user has hearing loss in a single ear and would, thus, have one hearing aid 110. In this situation it is desirable for dongle 140 to include cable with a single branch 220 and connector 228.

Additionally, power source 142 is shown as a triple-A (or AAA) battery commonly available at most stores. It should be understood that casing 210 may be designed to receive other common battery types and various configurations. For example, the batteries can be stacked "button" or "coin"-type batteries. Alternatively, the batteries could be AA, C, or D. Further, the batteries could be 3V, 4.5V or other voltage levels. Moreover, though cylindrical form-factor batteries are shown, rectangular or other form factors may also be used. By utilizing common types of batteries, dongle 140 allows a user to make use of available power sources for providing auxiliary power to hearing aid 110, increasing the ease of use, as the user is much more likely to have ready access to AAA batteries or other standard battery types than a zinc air battery typically used in non-rechargeable hearing aids. The standard battery allows for a more versatile power dongle system that is much more likely to be effective in providing the user with a backup power supply for their hearing aid.

Figure 3:
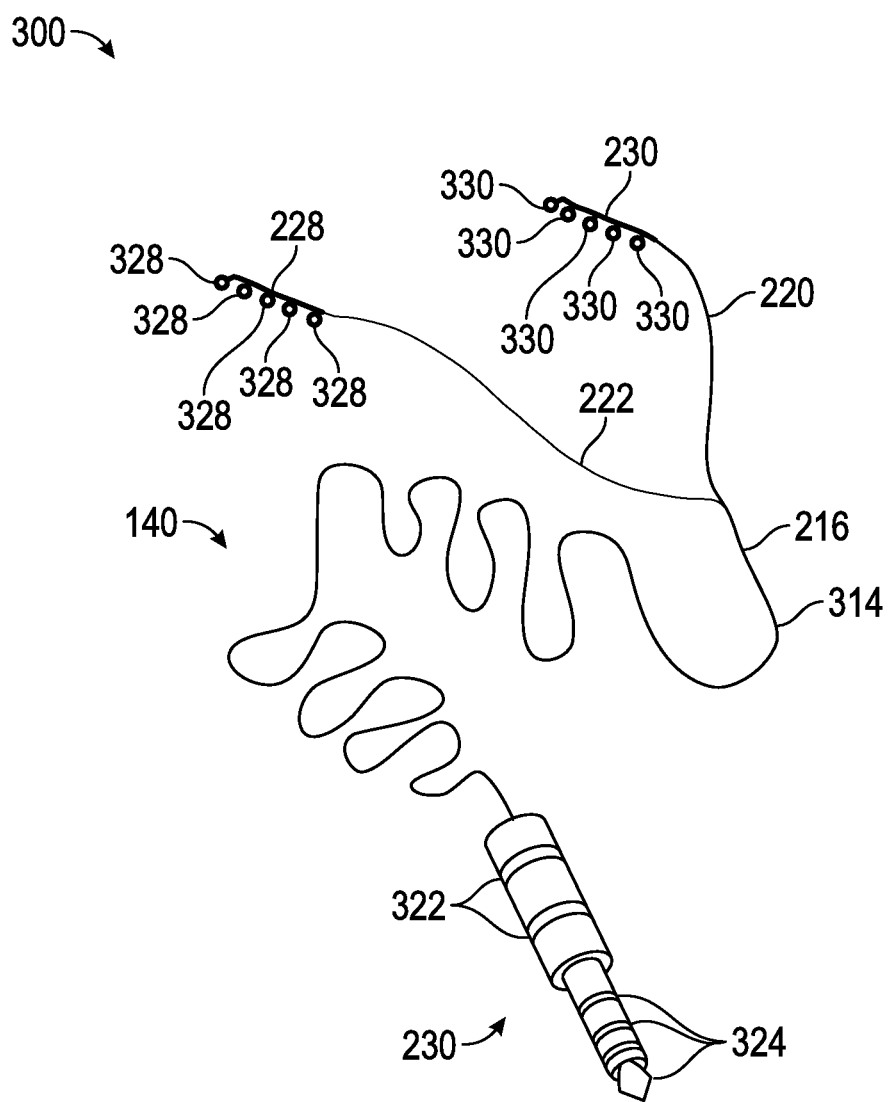
FIG. 3 is a perspective view of a second embodiment of the dongle of FIG. 1.

FIG. 2 provides a one possible embodiment 200 of dongle 140 including a casing 210 including internal power source 142 and coupled to cables 214 and 218. FIG. 3 provides a second possible embodiment of dongle 140 that without a casing or internal power source coupled to the cable.

FIG. 3 is a perspective view of a second embodiment 300 of dongle 140 of FIG. 1. Dongle 140 includes cable 314 (a combination of cable 214 and 218 of FIG. 2) having a first end coupled to media connector 230 and a second end that divides at branch point 216 to form two branches 220 and 222 for delivering a power signal and/or an audio signal to one or more hearing aids. The two branches 220 and 222 include connection interfaces 228 and 230 at the ends opposing branch point 216. Media connector 230 is a modified TRS connector. Media connector 230 includes the typical four contacts 324 for left audio, right audio, microphone, and audio ground two additional contacts 322 for power and power ground. Contacts 322 are on a second level of media connector 230 that is wider than the first level containing contacts 324, such that if media source 150 is not adapted to receive the modified TRS connector only contacts 324 are connected allowing dongle 140 to provide an audio signal from media source 150 to the hearing aids but not a power signal. Connection interfaces 228 and 230 each include five contacts 238 and 330 that correspond to the contacts on media connector 230. Contacts 238 and 330 each include a power, a power ground, a microphone, an audio ground, and either a right and left audio.

In an embodiment, a user couple's dongle 140 to one or more hearing aids via connection interfaces 228 and/or 230 and a media source 150 via media connector 230. Once a connection is made to both the hearing aids and media source 150, an audio signal is provided to the hearing aids from media source 150 via contacts 324 and corresponding contacts 328 and 330 of dongle 140, such that the hearing aids may modulate the audio signal and reproduce the audio signal as a modulated output signal for the hearing aid user. Dongle 140 may also provide a power signal suitable for the hearing aids to perform battery management operations from media source 150 to the hearing aids via contacts 322 and the corresponding contacts 328 and 330.

However, most media devices 150 are not adapted to receive the modified TRS version of media connector 230 and, therefore, for most media devices 150 that dongle 140 couples to using the modified TRS version no power signal is provided. Thus dongle 140 is able to provide an audio signal from media source 150 to the hearing aids but not a power signal (if dongle 140 includes a power source, such as power source 142 of FIGS. 1 and 2, then dongle may provide a power source to the hearing aids even if media source 150 is not adapted to receive the modified TRS). In alternative embodiments of media connector 230, such as a mini USB version, both power and audio signals may be provided.

In the illustrated embodiment of FIG. 3, dongle 140 is depicted as a pass-through connector for both an audio signal and a power signal from media source 150 to the hearing aids. In an alternative embodiment, dongle 140 may also include a power regulator, such as power regulator 206 of FIG. 2, to produce a regulated power signal suitable for the hearing aids to perform battery management operations (such as normal operation, recharge, etc.) from the power signal. Additionally, dongle 140 is shown with a modified TRS media connector 230. Other possible connectors capable of providing both an audio signal and a power signal are contemplated, such as a USB connector or mini USB connector, among other known connectors.

FIGS. 2 and 3 depict two possible embodiments 200 and 300 of dongle 140. Both embodiments 200 and 300 depict dongle 140 as one component, however, FIG. 4 depicts another possible embodiment of dongle 140, wherein dongle 140 may be separated into two components.

Figure 4:
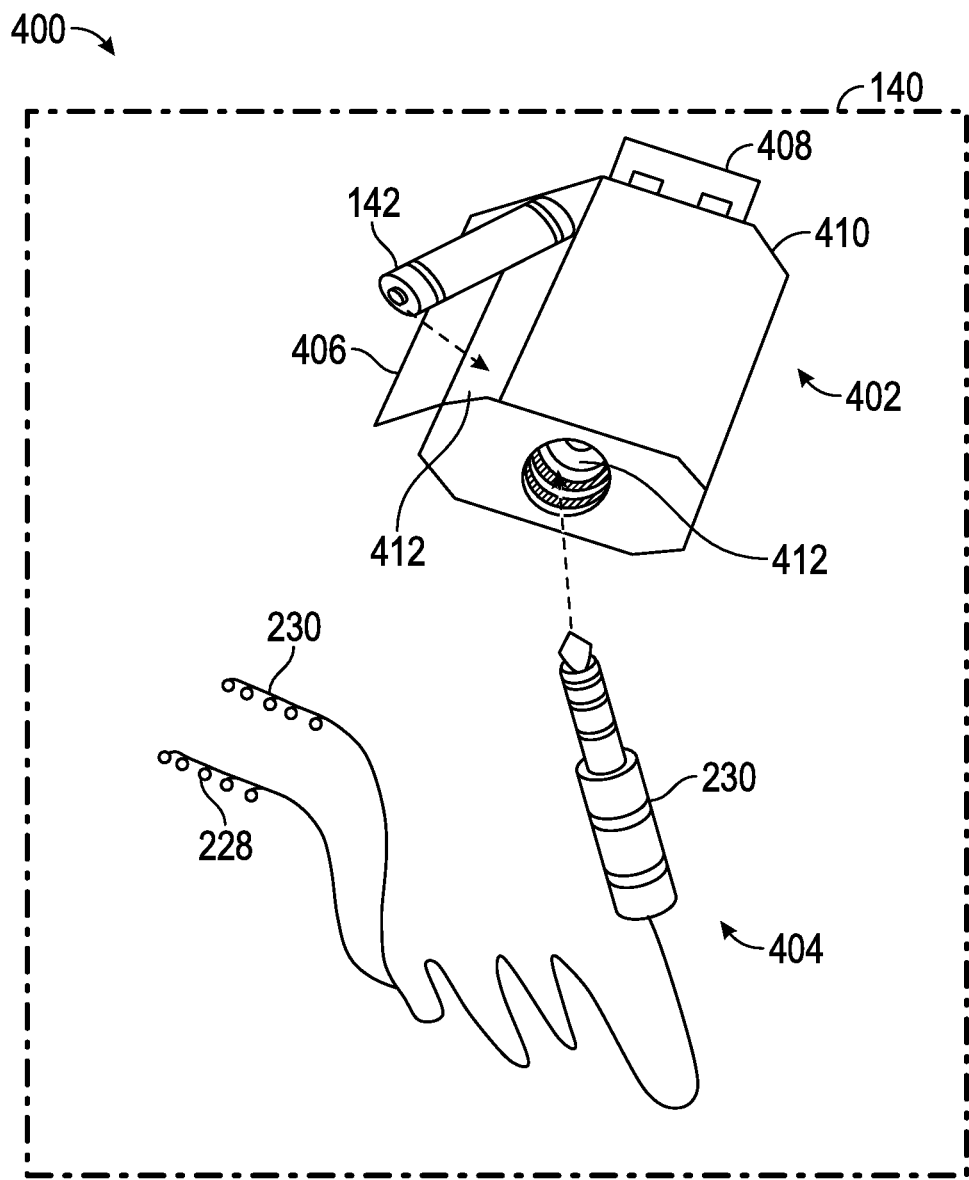
FIG. 4 is a perspective view of a third embodiment of the dongle of FIG. 1.

FIG. 4 is a perspective view of a third embodiment 400 of dongle 140 of FIG. 1. In this embodiment, dongle 140 includes two components, cable component 404 and dongle component 402, which when assembled form dongle 140. Cable component 404 includes media connector 230 (shown as a modified TRS connector) and connection interfaces 228 and 230 for releasably coupling cable component 404 to two hearing aids.

Dongle component 402 includes a casing 410 including a cover 406 that when open defines a cavity sized to contain a battery receptacle 412 for securing power source 142 within dongle component 402. In this embodiment, casing 410 is depicted in an exploded view, with power source 142 removed from battery receptacle 412 to demonstrate that power source 142 may be replaceable and that casing 410. In an alternative embodiment, cover 406 may be sealed, and power source 120 may be rechargeable. Casing 410 also includes two connector components, a USB connector 408 for coupling dongle component 402 to a media source, such as media source 150 of FIG. 1, and a cable connector 412 configured to receive media connector 230 of cable component 404.

In an example, connection interfaces 228 and 230 of cable component 404 are coupled to one or more hearing aids. Media connector 230 is coupled to media source 150 and cable component 404, which operates in a similar manner as to embodiment 300 of dongle 140. Alternatively, media connector 230 may be coupled to cable connector 412 of dongle component 402 to complete the assembly of dongle 140. If dongle component 402 is coupled to cable component 404 and cable component is coupled to one or more hearing aids then dongle 140 may provide a power signal form power source 142 to the one or more hearing aids as described in FIG. 2.

Dongle component 402 may also be coupled to a media source 150 via USB connector 408. When dongle component 402 is coupled to media source 408 and to one or more hearing aids through cable component 404, an audio signal may be provided to the one or more hearing aids from media source 150. Additionally, a power signal including a power supply from media source 150 and/or a power supply from power source 142 may be provided to the hearing aids. In an example, dongle 140 may disconnect power source 142 preserving the stored charge of power source 142 until media source 150 is disconnected. In another example, dongle 140 may supplement the power signal form media source 150 with a power supply from power source 142 to increase the power signal provided to the hearing aids. In yet another example, dongle 140 may provide power signal form power source 142 to the hearing aids, while at the same time recharging power source 142 from the power supplied by media source 150.

Thus an embodiment 400 of dongle 140 is disclosed, including a cable component 404 that may be utilized to provide an audio signal from media source to the one or more hearing aids, a power signal from media source to the one or more hearing aids or both and a dongle component 402 that can be coupled to cable component 404 to provide a power signal from power source 142 to the one or more hearing aids, a power signal from media source 150 to the one or more hearing aids, an audio signal from media source 150 to the one or more hearing aids, or a combination signal including a power signal from either power source 142 or media source 150 and audio signal from media source 150.

Figure 5:
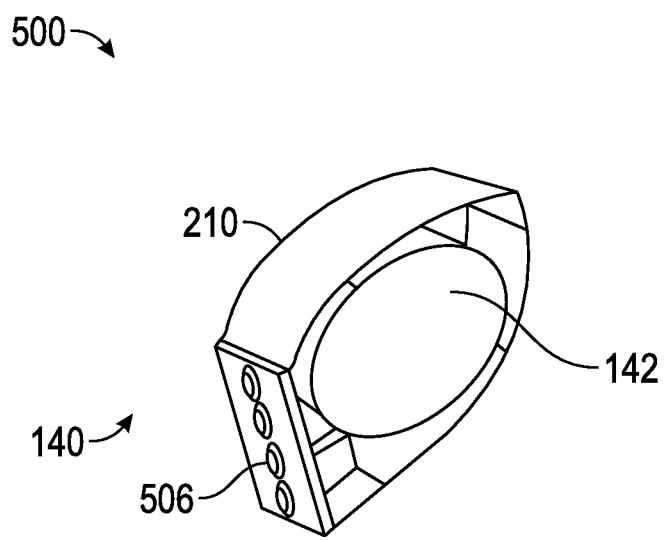
FIG. 5 is a perspective view of a fourth embodiment of the dongle of FIG. 1.

While FIGS. 2-4 show dongle 140 configured to provide a power signal and/or an audio signal to hearing aid 110, FIG. 5 depicts another embodiment of dongle 140 that is configured to provide a power signal to hearing aid 110 without ever having to couple to media source 150.

FIG. 5 is a perspective view of a fourth embodiment of dongle 140, which includes a battery, such as a power source 142. Dongle 140 includes casing 210 that defines a cavity sized to secure a power source 142 for powering a hearing aid, such as hearing aid 110 of FIG. 1 and includes a connection interface 506 integrated into casing 210, which is designed to releasable couple to a receptacle 124 of hearing aid 110 to establish an electrical contact and to provide power to hearing aid 110. Power source 142 may be a rechargeable or a disposable power source.

Connection interface 506 is configured to snap, lock, magnetically mate, hook or otherwise physically, releasably connect to the receptacle 124. In one example, connection interface 506 may be a mini plug and/or may use a spring locking mechanism to couple to the receptacle. In a second example, connection interface 506 may include a magnetic element (not shown) that magnetically couples to an element associated with the receptacle of the hearing aid, securing the connection interface 506 to receptacle 124 using magnetic forces. The element in the hearing aid may be metallic or may be otherwise magnetically attracted to the magnetic element of the connection interface 506.

Thus an embodiment of dongle 140 is disclosed, wherein dongle 140 is configured to attach to hearing aid 110 such that it's weight is fully supported by the magnetic or mechanical connection between connection interface 506 and receptacle 124, securing dongle 140 to hearing aid 110 behind the ear of the user in a hands free, wire free embodiment.

In the illustrated embodiments of FIGS. 2-5, connection interfaces 228, 230, and 506 and receptacle 124 are designed to mechanically and electrically connect such that receptacle 124 receives one of connection interfaces 228, 230, and 506 to form a connection assembly, through which dongle 140 can deliver a power signal and/or an audio signal to hearing aid 110. In one embodiment, connection interfaces 228, 230, and 506 includes a magnet and receptacle 124 includes a corresponding element that is magnetically attracted to the magnet of the connector or a magnet of opposite polarity to the magnet of connection interfaces 228, 230, and 506, which cooperate to secure the connection interfaces 228, 230, and 506 to the receptacle 124 via a magnetic field. In another embodiment, receptacle 124 includes the magnet and connection interfaces 228, 230, and 506 includes a magnet of opposite polarity or a corresponding element that is magnetically attracted to the magnet of the receptacle to secure the connection interfaces 228, 230, and 506 to receptacle 124 via the magnetic field. In another embodiment, a physical latch, snap, or clip (located on either the connection interfaces 228, 230, and 506 or the receptacle 124) may be used to secure the connection interfaces 228, 230, and 506 to receptacle 124.

Figure 6:
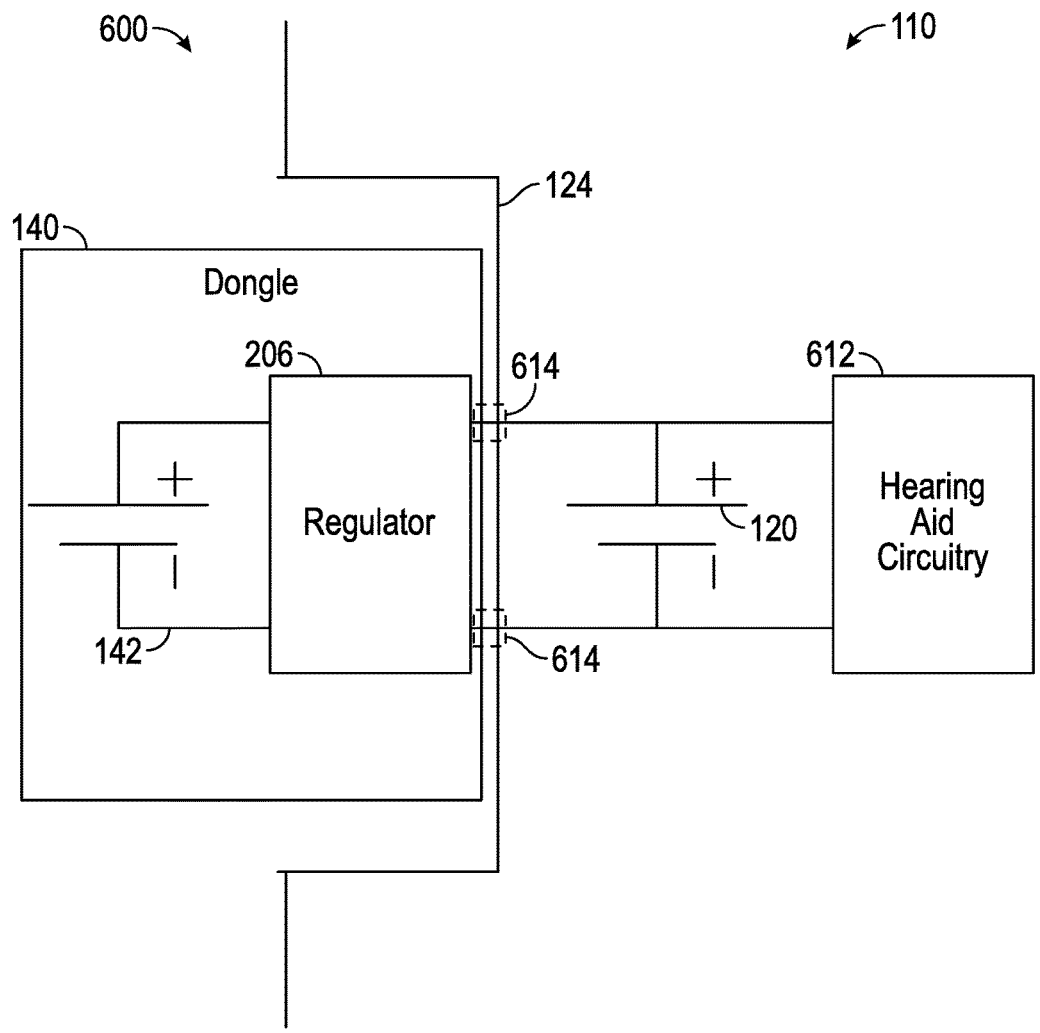
FIG. 6 is a block diagram of a circuit including of the dongle of FIGS. 2-5 connected to the hearing aid for recharging the power source.
Figure 7:
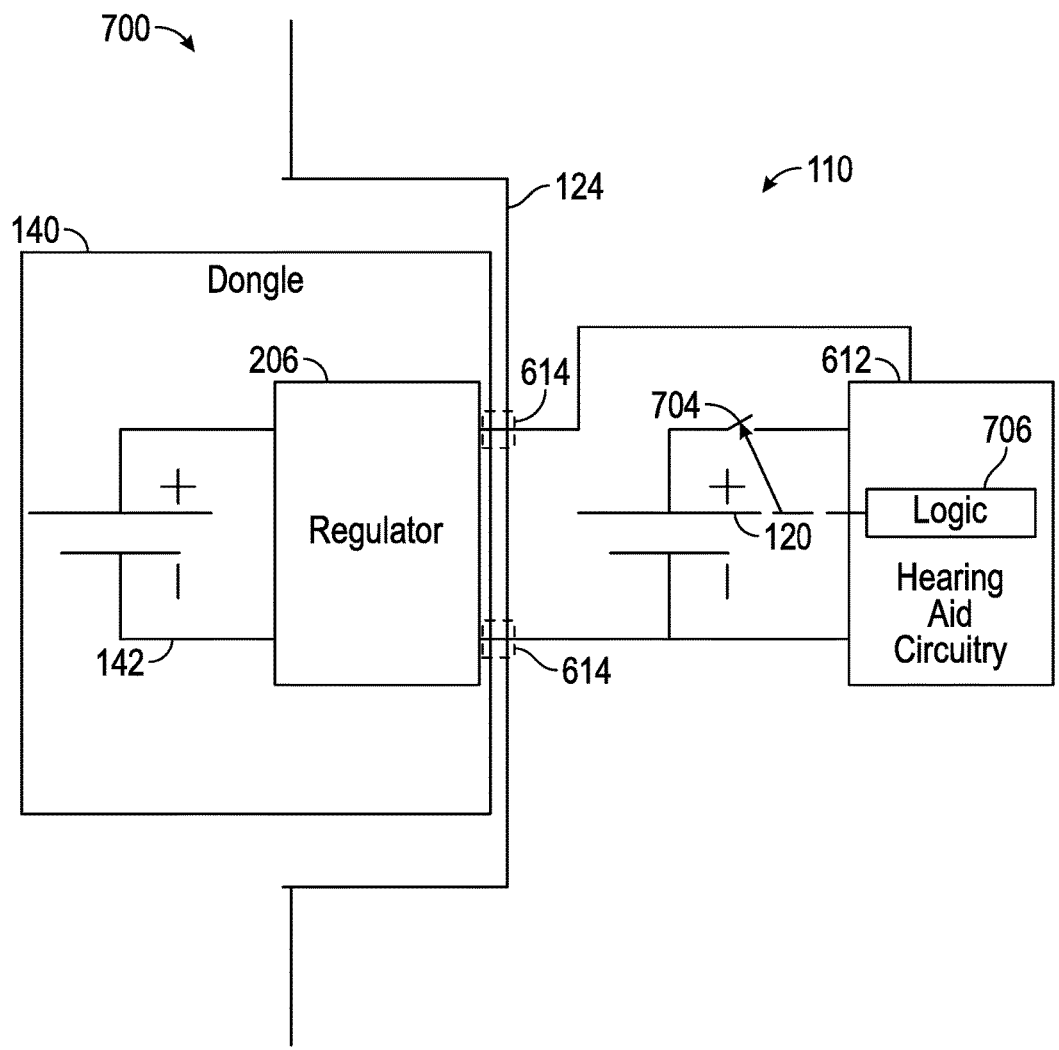
FIG. 7 is a block diagram of a circuit including the dongle of FIGS. 2-5 connected to the hearing aid for providing power assist modes.
Figure 8:
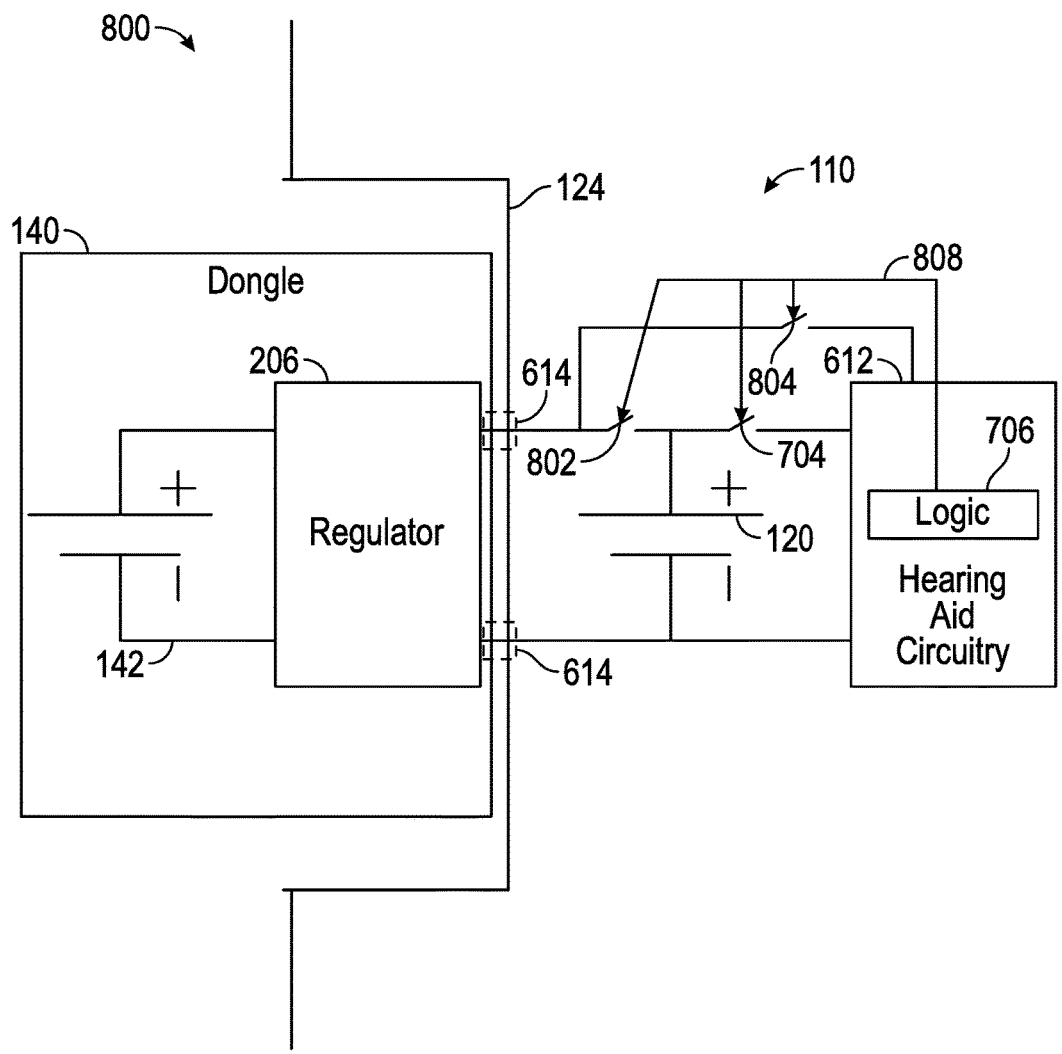
FIG. 8 is a block diagram of a circuit including of the dongle of FIGS. 2-5 connected to the hearing aid adapted to switch between a power assist mode, a recharge mode, a remote supply power mode, and a power assist/recharge mode.

FIGS. 2-5 show multiple embodiments 200, 300, 400, and 500 of dongle 140. FIGS. 6-8 depict possible circuit configurations of hearing aid 110 to utilize the power signal provided by dongle 140 as an auxiliary power source, a recharge power supply or both.

FIG. 6 is a block diagram of a dongle system 600 including a dongle 140 dongle of FIGS. 2-5 configured to couple to receptacle 124, which is shown as a recessed version, for recharging power source 120 within hearing aid 110. Receptacle 124 is recessed relative to a surface of hearing aid 110 for receiving the connector (such as connector interfaces 228, 230, or 506) of dongle 140.

Dongle system 600 includes dongle 140 coupled to receptacle 124 of a hearing aid 110 to form a connection assembly. Dongle 140 includes power source 142, which may include one or more batteries or other energy storage devices, which may be coupled to hearing aid 110 though a regulator 206 and through one or more electrically conductive terminals 614. When Dongle 140 is coupled to receptacle 124, power source 142 and regulator 206 are connected in parallel with power source 120 of hearing aid 110. Power source 120 is further coupled to hearing aid circuitry 612.

In the illustrated embodiment, when dongle 140 is uncoupled to receptacle 124, power source 120 provides power to hearing aid circuitry 612. In particular, power source 120 provides a voltage potential that can be converted into a current for powering hearing aid circuitry 612. However, when dongle 140 is coupled to receptacle 124, power source 142 within dongle 140 provides additional electrical current to power source 120. The additional electrical current is adjusted by power regulator 206 to an appropriate level for powering hearing aid 110 and/or for recharging power source 120.

FIG. 7 is a block diagram of a circuit 700 including dongle 140 dongle of FIGS. 2-5 coupled to receptacle 124 of hearing aid 110 for providing power assist modes. Dongle 140 and hearing aid 110 are the same as that described above with respect to FIG. 6, except that hearing aid 110 includes a switch 704 to selectively couple one terminal of power source 120 to hearing aid circuitry 612.

In the illustrated embodiment, when dongle 140 is coupled to receptacle 124, power source 142 and regulator 206 are coupled to hearing aid circuitry 612 through conductors 614. In this embodiment, hearing aid circuitry 612 may include logic 706 configured to control switch 704 to disconnect power 120 from hearing aid circuitry 612 in response to dongle 140. Switch 704 may also be controlled in a variety of other manners. For example, a contact sensor or proximity detector coupled to the surface of receptacle 124 could be used to trigger switch 704. Once switch 704 has been disconnected, dongle 140 provides power to hearing aid circuitry 612 in lieu of the internal power source 120 conserving the battery life.

FIG. 8 is a block diagram of circuit 800 including dongle 140 of FIGS. 2-5 connected to hearing aid 110 adapted to switch between a power assist mode, a recharge mode, a remote supply power mode, and a combined power assist/recharge mode. Dongle 140 and hearing aid 110 are the same as that described above with respect to FIG. 7, except that hearing aid 110 includes a second and third switch 802 and 804 to selectively switch between the power assist mode, the recharge mode, the remote supply power mode, and the combined power assist/recharge mode within hearing aid 110.

In the illustrated embodiment, when dongle 140 is coupled to receptacle 124, power source 142 and regulator 206 are coupled to hearing aid circuitry 612 through conductors 614. In this embodiment, hearing aid circuitry 612 may include logic 706 configured to provide a control signal 808 to switches 704, 802, and 804. Control signal 808 may cause hearing aid 110 to enter one of multiple modes. In a first mode control signal 808 causes switches 704 and 804 to close and switch 802 to open placing hearing aid 110 in the power assist mode, in which hearing aid circuitry 612 receives power from both dongle 140 and power source 120. In a second mode control signal 808 causes switches 802 and 704 to close and 804 to open placing hearing aid 110 in the recharge mode. In the third mode control signal 808 causes switches 802 and 704 to open and switch 804 to close placing hearing aid 110 in the remote power supply mode, in which the charge on power source 120 is conserved. In a fourth mode control signal 808 causes switches 802 and 804 to close and switch 704 to placing hearing aid 110 in the combined power assist/recharge mode, in which hearing aid 110 is simultaneously powered by power source 142 and power source 120 is recharged.

In the circuits described above with respect to FIGS. 6-8, a dongle is described that is configured to couple to a receptacle of a hearing aid to provide supplemental or replacement power to the hearing aid. In one instance, the external power dongle may include one or more batteries, which may be rechargeable or replaceable to provide a portable power supply for recharging and/or extending the usable power of one or more hearing aids.

In conjunction, embodiments of a hearing aid and a dongle are described above. The hearing aid embodiments including a first embodiment of a hearing aid and a second embodiment of a hearing aid described below.

The first embodiment of the hearing aid includes a hearing aid with a dual-use interface coupled to a rechargeable battery and configurable to mate with a connector of a dongle for receiving a power supply in a first mode and at least one of the power supply and an audio signal in a second mode. The hearing aid further including an audio circuit configured to receive the audio signal and to modulate the audio signal to compensate for the hearing impairment of the user and to reproduce the modulated audio signal as sound at a speaker. The hearing aid further including at least one microphone configured to convert sounds into a second audio signal and to provide the second audio signal to a processor in the audio circuit. The processor configured to either selectively combine the audio signal and the second audio signal to produce a combined audio signal and to modulate the combined audio signal to produce a modulated output signal or selectively shape the audio signal to generate a first shaped signal and the second audio signal to generate a second shaped signal and to selectively combine the first and second shaped signals to generate a modulated output signal.

The embodiment of the hearing aid includes a hearing aid with a processor configured to process audio signals to generated at least one shaped output signal configured to compensate for a hearing impairment of the user and a speaker configured to reproduce the shaped output signal as sound. The hearing aid further including an interface configurable to couple to a connector of a dongle for receiving a power supply in a first mode and for receiving at least one of the power supply and the audio signal in a second mode. The hearing aid can be configured to further include a rechargeable battery coupled to the interface and configured to recharge based on the power supply and to provide power to the processor.

The dongle embodiments including a dongle with a casing including a cavity for housing a power source. The dongle also includes a regulator and a connector configured to electrically and mechanically couple to a hearing aid, the dongle configured to provide a regulated power supply from the power source to the hearing aid during operation of the hearing aid. The power source may or may not be rechargeable. If the power source is not rechargeable the casing includes a removable cover which can be opened to allow a user to replace the power source within the cavity. However, if the power source is rechargeable the casing may be sealed. In a particular embodiment, the connector may include a magnetic element and secure to the hearing aid using magnetic forces. The dongle may also include a securing mechanism connected to the casing and configured to secure the dongle to an object, such as the clothing of the user.

Other dongle embodiments are disclosed that include a housing defining a receptacle for securing at least one battery within the housing. A wire may extend from the housing. The wire having a first portion with a first connector and a second portion with a second connector. Each of the connectors are configured to couple with a hearing aid, such that the dongle may couple with two hearings at the same time. A second wire may also extend form the housing having a third connector configured to couple to a computing device, wherein the dongle is configured to deliver at least one of a power supply and an audio signal from the computing device to the interface of the hearing aids via the wires. In some embodiments, the dongle may include a second component which acts as an adaptor configured to releasably couple the third connector to the computing device. The adapter being usable when the third connector is not compatible with the interface on the computing device.

While the above-discussion has focused on dongles that uses batteries, it should be appreciated that other power sources may be incorporated within the power dongle to deliver replacement power to a hearing aid. For example, a solar cell, capacitor, or other power source may be incorporated within power dongle to provide an appropriate power supply. It should also be understood, that regulator 206 of FIGS. 6 and 7 may also be incorporated into the hearing aid.

In addition to the above, embodiments of a hearing aid system are described below that include a computing device (such as a cell phone, personal digital assistant (PDA), or other computing system) configured to communicate with a hearing aid through a wireless communication channel to allow a user to utilize the computing device to configure a desired hearing aid profile of the hearing aid. In addition to volume and tone, the user can configure various parameters of a sound-shaping algorithm (hearing aid profile) and provide the hearing aid profile to the hearing aid for use by a processor of the hearing aid to shape audio signals to produce modulated audio signals, which can be reproduced by a speaker of the hearing aid. The computing device can store a larger number of pre-configured hearing aid profiles in addition to instructions for selecting one of the hearing aid profiles for use, instructions for modifying one of the hearing aid profiles to produce a modified version for use, and instructions for generating new hearing aid profiles. Thus, a user can customize his/her own listening experience by adjusting operation of the hearing aid using the computing device and without having to visit a hearing health professional.

Figure 9:
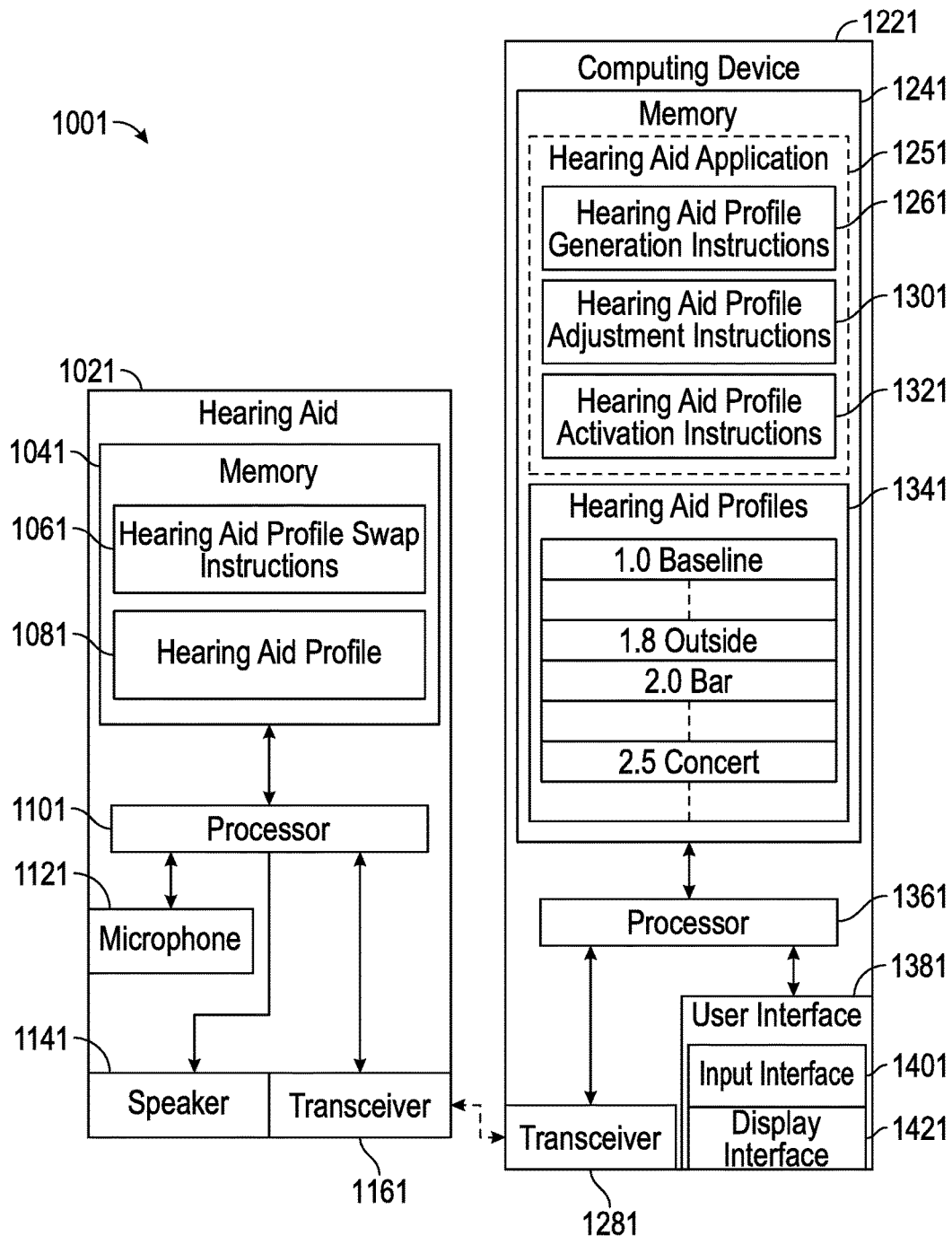
FIG. 9 is a block diagram of an embodiment of a hearing aid system including a hearing aid and a computing device for providing remote storage and adjustment of hearing aid profiles.

FIG. 9 is a block diagram of an embodiment of a hearing aid system 1001 including a hearing aid 1021 and a computing device 1221 for providing remote storage and adjustment of hearing aid profiles. Hearing aid 1021 includes a transceiver 1161 that is a radio frequency transceiver configured to communicate with computing device 1221 through a wireless communication channel. Hearing aid 1021 also includes a processor 1101 and a memory 1041, which is accessible by processor 1101. Memory device 1041 stores hearing aid swap instructions 1061 and at least one hearing aid profile 1081. Hearing aid 1021 further includes one or more microphones 1121 (microphone 1121 may be a single microphone or multiple microphones working in conjunction with each other) to receive environmental noise or sounds and to convert the sounds into electrical signals. One or more microphones 1121 provides the electrical signals to signal processor 1101, which processes the electrical signals according to a hearing aid profile associated with the user to produce a modulated output signal that is customized to a user's particular hearing ability. Processor 1101 is coupled to speaker 1141, which is configured to reproduce the modulated output signal as an audible sound at or within an ear canal of the user.

Computing device 1121 can be a personal digital assistant (PDA), smart phone or cell phone, tablet computer with a touch screen display, such as Apple's iPad®, notebook computer or other portable computing device adapted to send and receive radio frequency signals according to any protocol compatible with hearing aid 1021. The term "computing device" is used throughout this disclosure to refer to a system that has the capability to send and receive a wide variety of signals to and from a network, such as a public switched telephone network, a wireless network, a computer network, and combinations thereof. In some instances, the computing device may be a simple system designed to send and receive voice information, or a complex system including further computational functionality. A "portable computing device" is one that can be held in a hand or worn comfortably by a user. The portable computing device may be multifunctional and programmed to perform other tasks in addition to communicating with hearing aid 1021. Some examples of other tasks include, but are not limited to, executing a game, performing phone calls, accessing a calendar or providing an alarm clock. One representative embodiment of computing device 1221 includes the Apple iPhone®, which is commercially available from Apple, Inc. of Cupertino, Calif. or Blackberry®, available from Research in Motion Limited of Waterloo, Ontario. Other types of mobile telephone devices with short range wireless capability can also be used. Such telephone devices can be configured to communicate with hearing aid 1021 through the wireless communication channel.

Computing device 1221 includes a memory 1241 coupled to a processor 1361. Computing device 1221 further includes a transceiver 1281 coupled to processor 1361 and configured to send and receive data packets through the communication channel to transceiver 1161 in hearing aid 1021. Computing device 1221 also includes a user interface 1381, which includes a display interface 1421 (such as a liquid crystal display or LCD) to display information to a user and an input interface 1401 (e.g., a keypad, a keyboard, a pointer, or some other interface for receiving user input) to receiver user input, respectively. In some embodiments, display interface 1421 and input interface 1401 are combined in a single component, such as in a touch screen on a smart phone.

Memory 1241 stores a plurality of hearing aid profiles 1341 and a plurality of instructions which are executable by processor 1361, including a hearing aid application 1251. Hearing aid application 1251 includes hearing aid profile generation instructions 1261, profile adjustment instructions 1301, and profile activation instructions 1321. Hearing aid profile generation instructions 1261, when executed by processor 1361, cause processor 1361 to adjust an existing hearing aid profile, such as one of hearing aid profiles 1341 and/or a hearing aid profile executed by processor 1101 within hearing aid 1021. Hearing aid activation instructions 1321, when executed by processor 1361, cause processor 1361 to provide a hearing aid profile or a hearing aid profile adjustment to hearing aid 1021 via transceiver 1281.

As mentioned above, both hearing aid 102 and computing device 122 include memory devices to store hearing aid profiles. As used herein, the term "hearing aid profile" refers to a collection of acoustic configuration settings for hearing aid 1021, which are used by processor 1101 within hearing aid 1021 to shape acoustic signals. Each of the hearing aid profiles includes one or more parameters configured according to the user's hearing characteristics and designed to compensate for the user's hearing loss or otherwise shape the sound received by one or more microphones 1121 for a particular acoustic environment or situation. In particular, the one or more parameters are configurable to customize the sound shaping and to adjust the response characteristics of hearing aid 1021, so that signal processor 1101 can apply a customized hearing aid profile to a sound-related signal to compensate for hearing deficiencies of the user, eliminate unwanted sounds or otherwise enhance the sound-related signals. Such parameters can include signal amplitude and gain characteristics, signal processing algorithms, frequency response characteristic, coefficients associated with one or more signal processing algorithms, or any combination thereof. The signal amplitude and gain characteristics may be frequency specific, making it possible to amplify signal content at selected frequencies and to suppress the signal content at other frequencies. In some instances, processor 1101 executes instructions stored in memory 1041 to shape audio signals to compensate for the user's hearing deficiencies, and the one or more parameters are configurable by replacing or modifying the instructions.

In an example, computing device 1221 receives a signal to select a hearing aid profile from the plurality of hearing aid profiles 1341. The signal may include a user selection of a profile received from user interface 1381 or from hearing aid 1021 detecting changes in the acoustic environment. In one example, an identifier associated with the selected hearing aid profile is presented to the user on the display interface 1421 together with one or more user-selectable options, such as a first option to edit the hearing aid profile, a second option to activate the profile, and/or a third option to generate a new hearing aid profile. Such user-selectable options can include soft-buttons, pull-down or drop-down menus, and/or other types of buttons or menus.

If the user selects the first option to edit the hearing aid profile, processor 1361 executes hearing aid profile adjustment instructions 1301 and provides text and/or graphics (including one or more user-selectable options) in a graphical user interface to display interface 1421. The user can interact with input interface 1401 in response to the graphical user interface to edit the hearing aid profile settings. Once the profile is adjusted, the processor 1361 stores the alterations in memory 1241 (either overwriting the selected hearing aid profile or inserting a new hearing aid profile into hearing aid profiles 1341) and executes hearing aid profile activation instructions 1321 to communicate the adjusted profile to hearing aid 1021 through the communication channel. This adjustment process may operate in a manner similar to an adjustment process executed by a hearing health professional (such as an audiologist), except that the user can configure his/her own hearing aid profiles using a cell phone or other computing device, and without having to visit the health professional. If the user selects the second option to activate the hearing aid profile, processor 1361 executes hearing aid profile activation instructions 1321 and communicates the selected hearing aid profile to hearing aid 1021. In this instance, the user may activate a recommended hearing aid profile by interacting with the input interface, causing the recommended hearing aid profile to be sent to hearing aid 1021, which stores the hearing aid profile and applies it to shape sounds.

If the user selects the third option to generate a new profile, processor 1361 executes hearing aid profile generation instructions 1261, which allows the user to generate a new profile. In one instance, hearing aid profile generation instructions 1261 provide a baseline hearing aid profile for the user and provides a graphical user interface including user-selectable options for configuring the hearing aid profile as desired. Alternatively, hearing aid profile generation instructions 1261 provide a different hearing aid profile as a starting point and provides a graphical user interface including user-selectable options for configuring the different hearing aid profile as desired. Hearing aid profile generation instructions 1261 may also include an automatic process that causes computing device 1221 to detect and analyze the user's current acoustic environment and to generate a baseline profile for the user's current acoustic environment, which includes sound filters and gain adjustments to compensate for the user's hearing deficiency while removing undesirable background noise. Once generated, the user may further edit the generated hearing aid profile or simply select it for activation. In each instance, processor 1361 stores the profile in memory 1241. Processor 1361 also selectively executes hearing aid profile activation instructions 1321 in response to the user's authorization to activate the hearing aid profile. In some instances, computing device 1221 may be configured to automatically a selected hearing aid profile to hearing aid 1021 without user selection. Hearing aid 1021 receives a hearing aid profile from computing device 1221 and processor 1101 executes hearing aid profile swap instructions 1061 to replace hearing aid profile 1081 with the profile received from computing device 1221. Once the profiles are swapped, processor 1101 uses the hearing aid profile 1081 to shape electrical signals representative of sound received at one or more microphones 1121 to produce a shaped audio signal. Processor 1101 provides the shaped audio signal to speaker 1141 for reproduction to the user as audible sound.

Figure 10:
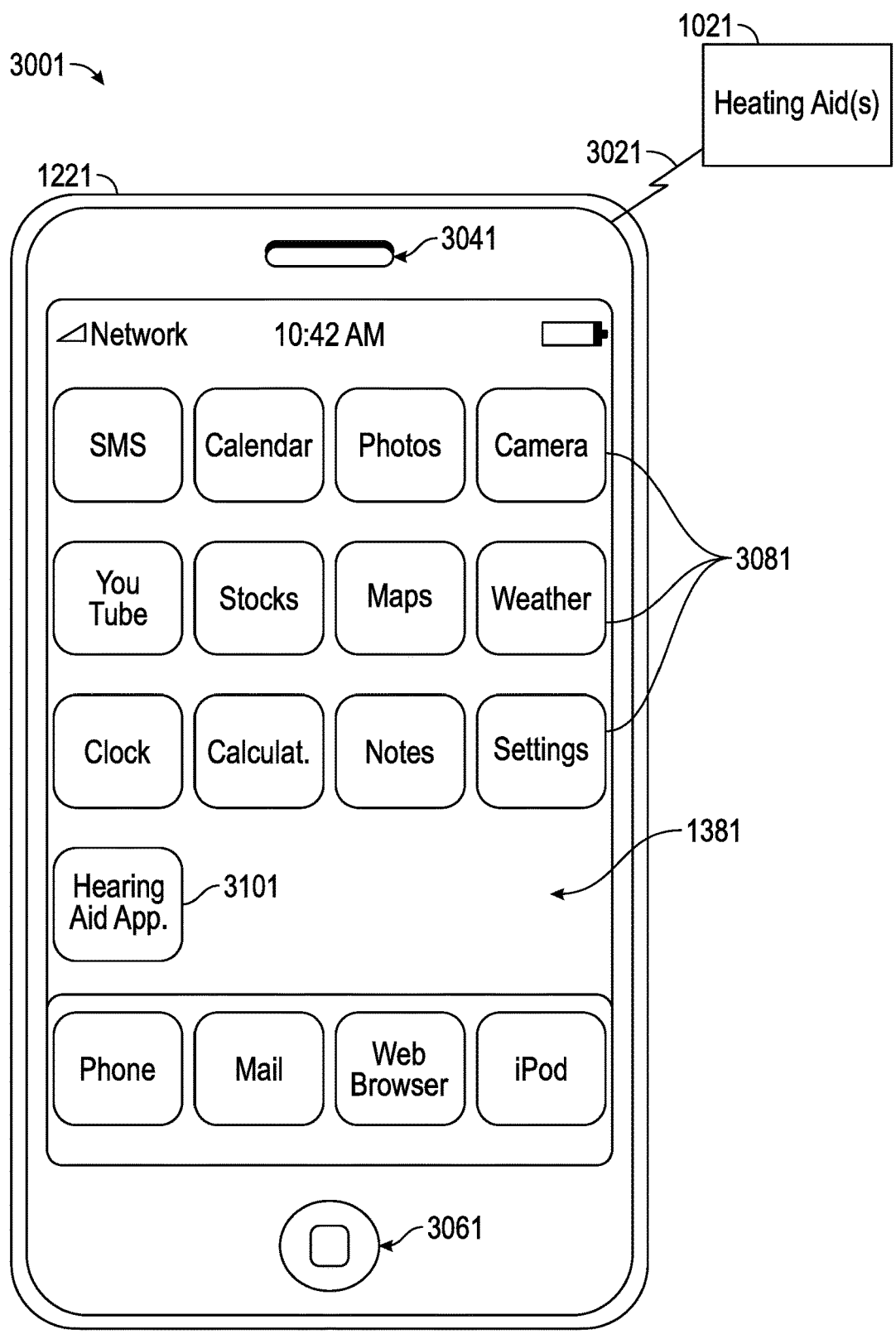
FIG. 10 is a partial top view and partial block diagram of an embodiment of the hearing aid system of FIG. 9.

FIG. 10 is a partial top view and partial block diagram 3001 of an embodiment of the hearing aid system 1001 of FIG. 9. Diagram 3001 includes computing system 1221, represented by a mobile telephone having a touch-screen interface 1381 for receiving user input and for displaying information and user-selectable options, such as buttons 3081. Computing system 1221 includes a speaker (generally indicated at 3041), display interface 1421 and input interface 1401 implemented as a touch-screen interface 1381, and one or more microphones (generally indicated at 3061). Further, computing system 1221 includes a processor and instructions executable by the processor to communicate with hearing aid 1021 via a wireless communication channel. In the illustrated example, a graphical user interface displayed on touch-screen interface 1381 includes a hearing aid application button 3101, which accessible by a user to trigger execution of hearing aid application 1251 (depicted in FIG. 9) to select a hearing aid profile for communication to hearing aid 1021 through wireless communication channel 3021. In an embodiment, wireless communication channel 3021 is a short-range wireless channel, such as a Bluetooth® communication channel.

In an example, the user may utilize his/her cell phone or computer to configure, adjust, or otherwise alter the sound-shaping functionality of hearing aid 1021. In a particular example, the hearing aid application 1251 (represented by hearing aid application button (or icon) 3101) may be downloaded from a network and stored in a memory of computing device 1221. Once installed, hearing aid application 1251 can be triggered by a user through interaction with hearing aid application button 3101, causing computing device 1221 to select, modify, or create a hearing aid profile and to communicate wirelessly with hearing aid 1021 to provide the hearing aid profile to reconfigure operation of hearing aid 1021. While the above-examples describe the communication between computing device 1221 and a single hearing aid 1021, it should be appreciated that many hearing impaired individuals have hearing impairments in both ears and wear a pair of hearing aids, one in their right ear and one in their left ear. Computing system 1221 is configured to select, edit or create a hearing aid profile for each hearing aid and provide the selected hearing aid profiles to their respective hearing aids. An example of a system including a pair of hearing aids is described below with respect to FIG. 11.

Figure 11:
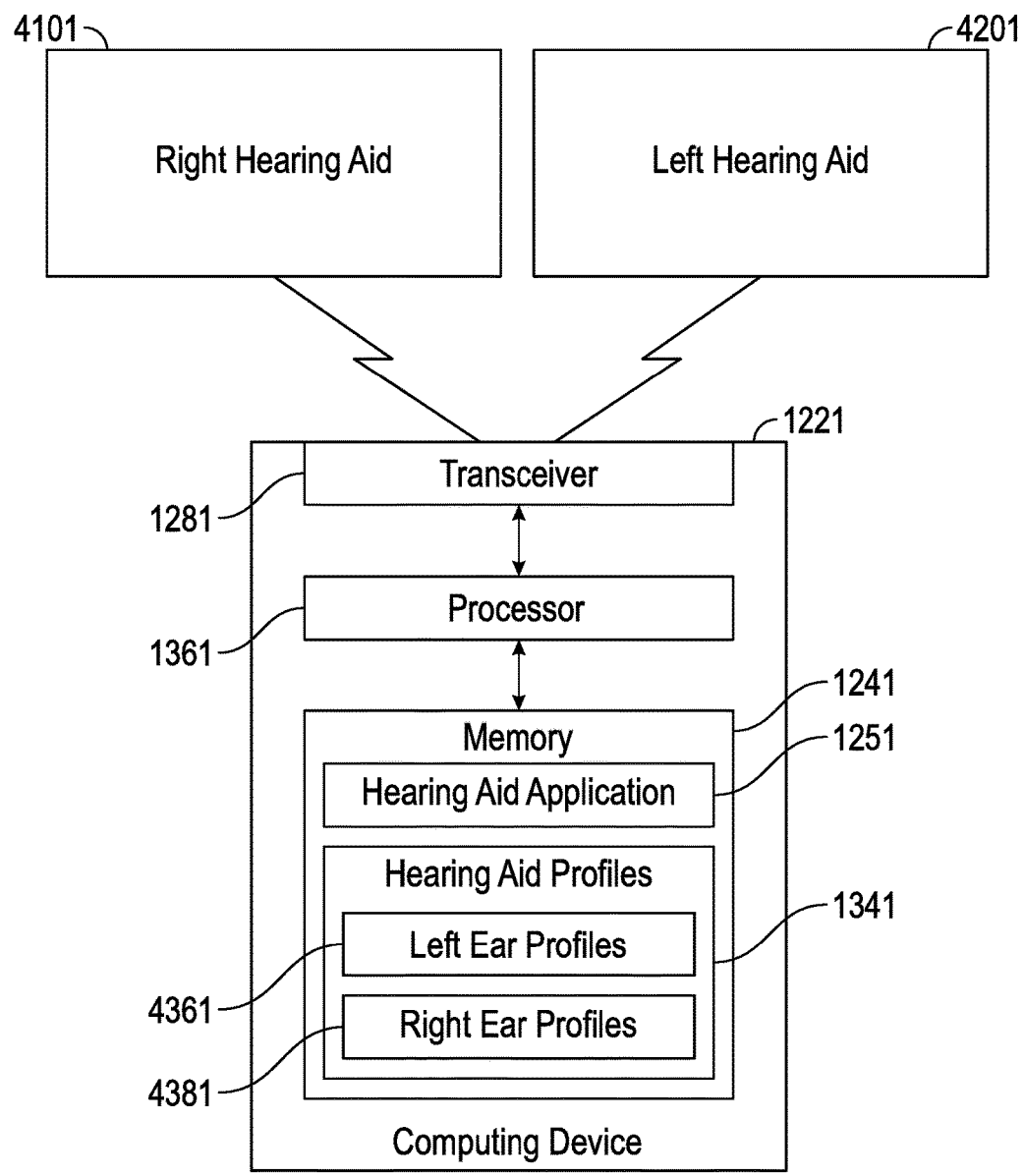
FIG. 11 is a block diagram of an embodiment of a hearing aid system of FIG. 9 including a pair of hearing aids and a computing device for providing remote storage and independent adjustment of hearing aid profiles for each hearing aid.

FIG. 11 is a block diagram of a hearing aid system 4001, which is an embodiment of the hearing aid system 1001 of FIG. 9, including a pair of hearing aids (right hearing aid 4101 and left hearing aid 4201) and computing device 1221 for providing remote storage and adjustment of hearing aid profiles 1341, including right ear profiles 4361 for use by right hearing aid 4101 and left ear profiles 4381 for use by left hearing aid 4201. Both right hearing aid 4101 and left hearing aid 4201 include the functionality of hearing aid 1021 (depicted in FIG. 9). Right hearing aid 4101 applies a selected right ear profile from right ear profiles 4361 to shape sounds reproduced for the right ear of the user, and left hearing aid 4201 applies a selected left ear profile from left ear profiles 4381 to shape sounds reproduced for the left ear. In some instances, the hearing aid profiles 1341 compensate for the user's hearing aid impairments by shaping the sounds different for the right ear and the left ear. Processor 1361 executes hearing aid application 1251 to select, modify, or create a hearing aid profile for the right hearing aid 4101 and/or the left hearing aid 4201. In a particular example, hearing aid application 1251 allows the right hearing aid 4101 and the left hearing aid 4201 to be configured independently. Moreover, hearing aid application 1251 allows for independent selection, adjustment, and/or delivery of the hearing aid profile to a particular hearing aid, making it possible for the user to adjust one hearing aid without adjusting the other. In particular, the user may adjust or replace a right ear profile without altering the left ear profile.

In an embodiment, hearing aid application 1251 may be configured to automatically make corresponding adjustments to a hearing aid profile for the other hearing aid. In this example, hearing aid application 1251 receives user inputs to configure a selected left ear profile, and adjusts the selected left ear profile and a corresponding right ear profile based on the user input before providing both the left and right ear profiles to left hearing aid 4101 and right hearing aid 4201, respectively. By providing for independent and/or coordinated adjustment of left hearing aid 4101 and right hearing aid 4201, hearing aid system 4001 provides a fully customizable hearing experience. Computing device 1221 includes memory 1241 coupled to processor 1361, which is coupled to transceiver 1281. Memory 1241 includes hearing aid application 1251 and hearing aid profiles 1341, which are executable by processor 1361 to cause processor 1361 to operate as described with respect to FIG. 9. Hearing aid profiles 1341 are divided into two sets: left ear profiles 4361 and right ear profiles 4381. Left ear profile 4361 and right ear profile 4381 are configured to shape acoustic signals individually for either the left hearing aid 4101 or the right hearing aid 4201 to provide a customized sound experience, which may include different sound-shaping for left hearing aid 4101 as compared to right hearing aid 4201.

In one example, computing device 1221 receives a signal to select a right ear profile from the plurality of right ear profiles 4381. In response to the signal, processor 1361 executes hearing aid application 1251 to allow the user to edit the right ear profile, or to provide the right ear profile from right ear profiles 4381 to right hearing aid 4101, which uses the right ear profile to shape sound as described in FIG. 9. If hearing aid application 1251 is configured to group left ear profiles 4361 and right ear profiles 4381 into left/right pairs, hearing aid application 1251 may selectively adjust the corresponding left ear profile from the plurality of left ear profiles 4361 and provide the corresponding left ear profile (including any such adjustments) to left hearing aid 4201, which uses the left ear profile to shape sound as described in FIG. 9. In another example, the user interacts with use interface 1381 to select, edit, or generate a new hearing aid profile for one or both of the hearing aids 4101 and 4201. It should be understood that the user may only elect to select, edit, or generate a hearing aid profile for the right hearing aid, the left hearing aid or both. Alternatively, the user may interact with hearing aid application via user interface 1381 to generate a hearing aid profile scheme, which allows the user to select, edit, or generate a pair of hearing aid profiles to be used in conjunction with each other to achieve the desired sound shaping results.

Although the present invention has been described with reference to preferred embodiments, workers skilled in the art will recognize that changes may be made in form and detail without departing from the scope of the invention.

What is claimed is:

1. A media source comprising:
a non-transitory computer readable medium comprising instructions that, when executed by one or more processors, cause the one or more processors to perform operations comprising:
displaying a graphical user interface comprising a plurality of user-selectable input options including:
a first input option configured to receive user input corresponding to adjustment of a left listening device profile;
a second input option configured to receive user input corresponding to adjustment of a right listening device profile; and
a third input option configured to receive user input corresponding to an adjustment of at least one parameter of both the right listening device profile and the left listening device profile;
receiving a user input corresponding to one of the plurality of user-selectable input options; and
communicating the left listening device profile to a left listening device and the right listening device profile to a right listening device through a wireless communication channel based on the user input.

2. The media source of claim 1, wherein the non-transitory computer readable medium further comprises instructions that cause the one or more processors to:
operate in one of a first device profile and at least a second device profile based on the user input,
wherein, in the first device profile, the one or more processors are configured to separately adjust at least one of the left and the right listening device profiles in response to user input, and
wherein, in the second device profile, the one or more processors are configured to adjust the left listening device profile and the right listening device profile in unison in response to user input.

3. The media source of claim 1, wherein at least one of the left listening device profile and the right listening device profile comprises a volume level of the left listening device and the right listening device, respectively.

4. The media source of claim 1, wherein at least one of the left listening device profile and the right listening device profile comprises a tone of the left listening device and the right listening device, respectively.

5. The media source of claim 1, wherein at least one of the first input option, the second input option, and the third input option is configured to receive user input corresponding to a selection of an acoustic environment.

6. The media source of claim 5, wherein at least one of the left listening device profile and the right listening device profile is configured to enhance performance of the left listening device and the right listening device, respectively, in the acoustic environment.

7. The media source of claim 5, wherein the acoustic environment comprises an outdoor environment or an environment including a crowd of people.

8. The media source of claim 1, wherein at least one of the first input option, the second input option, and the third input option includes an icon indicative of an acoustic environment.

9. The media source of claim 1, wherein the non-transitory computer readable medium further comprises instructions that cause the one or more processors to:
provide a user-selectable input option for creating a new listening device profile;
provide user options for generating the new listening device profile in response to receiving the user input for creating the new listening device profile;
store the new listening device profile in a memory accessible via the one or more processors; and
provide the new listening device profile to the left listening device and the right listening device via the wireless communication channel.

10. A media source having a computer program product, the computer program product comprising:
a non-transitory computer readable storage medium storing a computer usable program code executable to perform acts comprising:
displaying a graphical user interface comprising a plurality of user-selectable input options including—
a first input option and a second input option configured to receive a user selection corresponding to independent adjustment of a left listening device profile and a right listening device profile, respectively; and
a third input option configured to receive user selection indicative of a coordinated adjustment of the right listening device profile and the left listening device profile;
receiving a first user selection indicative of a selection of an acoustical environment;
receiving a second user selection corresponding to an adjustment of at least one setting of either the left listening device profile, the right listening device profile, or both the right listening device profile and the left listening device profile; and
transmitting the left listening device profile and the right listening device profile to a left listening device and a right listening device, respectively, via a wireless communication channel based on the first user selection and second user selection.

11. The computer program product of claim 10, wherein the third input option is configured to receive input corresponding to an adjustment of at least one of a volume level and a tone of at least one of the left listening device profile and the right listening device profile.

12. The computer program product of claim 10, wherein the third input option is configured to receive input corresponding to a coordinated adjustment of a volume level and a tone of both the left listening device profile and the right listening device profile.

13. The computer program product of claim 10, wherein at least one of the left listening device profile and the right listening device profile is configured to enhance performance of the left listening device and the right listening device, respectively, in the acoustic environment.

14. The computer program product of claim 10, wherein the acoustic environment comprises an outdoor environment or an environment including a crowd of people.

15. The computer program product of claim 10, wherein the acoustic environment comprises an outdoor environment.

16. The computer program product of claim 10, wherein the acoustic environment comprises a quiet room.

17. The computer program product of claim 10, wherein the third input option is positioned in the graphical user interface between the first input option and the second input option.

18. The computer program product of claim 10, wherein the computer usable program code further performs the acts of:

providing a user-selectable input option for creating a new listening device profile;
providing user options for generating the new listening device profile in response to receiving the user selection for creating the new listening device profile;
storing the new listening device profile in a memory of the media source; and
providing the new listening device profile to the left listening device and the right listening device via the wireless communication channel.

* * * * *